(12) United States Patent
Brechbühl et al.

(10) Patent No.: US 8,122,765 B2
(45) Date of Patent: Feb. 28, 2012

(54) MEMBRANE PROTECTION FOR A SENSOR HAVING A MEMBRANE, AND SENSOR HAVING A MEMBRANE AND MEMBRANE PROTECTION

(75) Inventors: Stefan Brechbühl, Weinfelden (CH); Peter Wolfer, Kleinandelfingen (CH)

(73) Assignee: Kistler Holding, AG, Winterthur (CH)

( * ) Notice: Subject to any disclaimer, the term of this patent is extended or adjusted under 35 U.S.C. 154(b) by 723 days.

(21) Appl. No.: 12/301,705

(22) PCT Filed: Jun. 4, 2007

(86) PCT No.: PCT/CH2007/000278
§ 371 (c)(1),
(2), (4) Date: Nov. 20, 2008

(87) PCT Pub. No.: WO2007/140641
PCT Pub. Date: Dec. 13, 2007

(65) Prior Publication Data
US 2009/0260434 A1    Oct. 22, 2009

(30) Foreign Application Priority Data
Jun. 7, 2006    (CH) .................................. 923/06

(51) Int. Cl.
*G01D 11/00* (2006.01)
*G01D 11/24* (2006.01)
*G01L 19/06* (2006.01)
(52) U.S. Cl. ............................ 73/431; 73/706
(58) Field of Classification Search ............ 73/431, 73/706, 432.1, 866.5; 381/189
See application file for complete search history.

(56) References Cited

U.S. PATENT DOCUMENTS

| | | | |
|---|---|---|---|
| 5,551,300 A * | 9/1996 | Vurek et al. ................... 73/706 |
| 6,197,172 B1 | 3/2001 | Dicks et al. |
| 6,435,017 B1 | 8/2002 | Nowicki, Jr. et al. |
| 6,614,911 B1 | 9/2003 | Watson et al. |
| 6,930,608 B2 * | 8/2005 | Grajales et al. ............. 340/573.5 |
| 7,035,422 B1 * | 4/2006 | Wiener ......................... 381/388 |
| 7,165,467 B2 * | 1/2007 | Klees et al. .................. 73/866.5 |
| 2004/0168530 A1 * | 9/2004 | Adolfs et al. ................ 73/866.5 |
| 2004/0237629 A1 | 12/2004 | Lenzing et al. |
| 2006/0251284 A1 * | 11/2006 | Wiener ......................... 381/388 |

FOREIGN PATENT DOCUMENTS

| | | | |
|---|---|---|---|
| EP | 1547630 A1 * | 6/2005 | |
| FR | 2555390 B1 * | 1/1987 | ............... 381/189 |
| GB | 2217846 | 11/1989 | |
| GB | 2220116 | 12/1989 | |

OTHER PUBLICATIONS

English translation of International Preliminary Examination Report on Patentability, issued Jan. 13, 2009.

* cited by examiner

*Primary Examiner* — Thomas P Noland
(74) *Attorney, Agent, or Firm* — Dority & Manning, P.A.

(57) ABSTRACT

The invention describes membrane protections for a sensor having a membrane, which membrane protection does not increase the external diameter of a sensor and can be easily removed from a hole in which the sensor is installed. The membrane protection can be fastened to an inner surface of a front region of a sensor using a clip system and thus forms a unit with the sensor. The membrane protection for a sensor which can be screwed into a hole of an installation part and is provided with a membrane in the front region. The membrane protection has a clip system in order to be internally fastened in the front region of such a sensor. The sensor has a membrane protection which is internally fitted to the front region of the sensor using a clip system.

15 Claims, 2 Drawing Sheets

MEMBRANE PROTECTION FOR A SENSOR HAVING A MEMBRANE, AND SENSOR HAVING A MEMBRANE AND MEMBRANE PROTECTION

CROSS-REFERENCE TO RELATED APPLICATIONS

This application claims priority to Swiss Application No. 923/06 filed Jun. 7, 2006, and International Application Serial No. PCT/CH2007/000278 filed Jun. 4, 2007.

TECHNICAL FIELD

The invention relates to a membrane protection for a sensor with a membrane, which may be screwed into a bore of a mounting part, as well as such a sensor comprising a membrane protection according to the preambles of the independent claims.

BACKGROUND

Many sensors have a sensitive membrane which are prone to be readily damaged in environments in which they are used. For example, such a damage may be caused by a mechanical contact or by flames in an internal combustion engine. Already the incorporation and/or removal of a sensor can damage the membrane. Front-sealing pressure sensors are even clipped at the membrane at a stopper of a mounting part, which might be a strong mechanical stress for the membrane. Therefore, for the protection of the membranes membrane protections are provided.

A known membrane protection consists of a metallic grating, which may be screwed onto an external thread of a sensor tip. FIG. 1 is a schematic perspective view and shows a front region 8 of a sensor 1 with a membrane 2 and with a membrane protection 3 having apertures 5, wherein the membrane protection may be screwed onto an external thread 4. The membrane protection 3 may be carefully exchanged after it has been damaged, without the membrane 3 suffering from it. However, this membrane protection widens the sensor tip which often is detrimental. Another disadvantage is that the membrane protection might be inadvertently screwed off when the sensor is removed and as a result it remains in a mounting part.

Another known solution consists of an even grating, which is introduced into an installation bore, before the sensor is incorporated. However, this arrangement has the disadvantage that after the removal of the sensor the membrane protection has to be removed from the bore with great effort.

BRIEF OBJECTS AND SUMMARY OF THE INVENTION

The object of the present invention is to describe a membrane protection for an initially mentioned sensor with a membrane which does not enlarge the external diameter of the sensor and which may be readily removed from a bore into which the sensor is installed. Another object is to describe a sensor with such a membrane protection.

The object is solved by the characteristics of the independent claims.

The invention relates to the idea that the membrane protection may be attached in the inside of the front region of a sensor by means of a clip system and thus forms an unit together with the sensor. Other preferred embodiments are described in the dependent claims.

BRIEF DESCRIPTION OF THE DRAWINGS

In the following, the invention is illustrated in more detail with respect to the drawings.

DETAILED DESCRIPTION OF EXEMPLARY EMBODIMENTS

Figure 1:
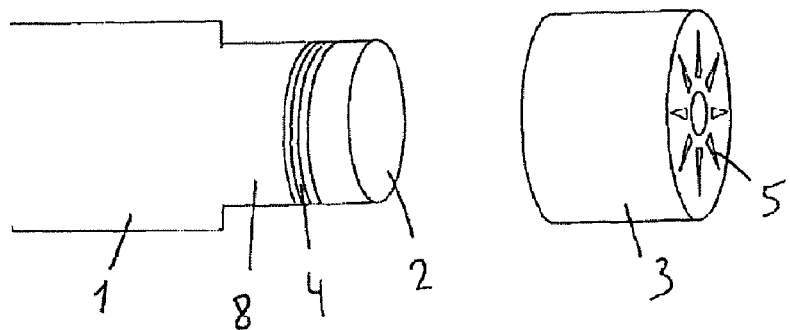
FIG. 1 is a schematic perspective view of a sensor with a membrane protection of the prior art.
Figure 2:
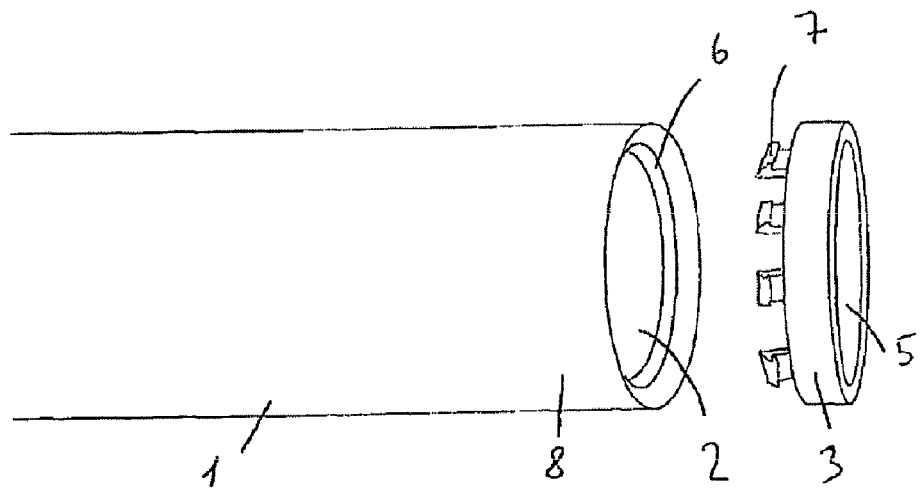
FIG. 2 is a schematic perspective view of a sensor according to the present invention with a membrane protection according to the present invention.

In turn, FIG. 2 shows a front region 8 of a sensor 1 with a membrane 2 in the front region 8. In the inside, the front region 8 exhibits a groove 6 according to the present invention, into which a clip system 7 is able to engage. Such a clip system 7 is shown at an adequate membrane protection 3 according to the present invention. For example, it consists of individual teeth 7 which are attached at the membrane protection 3 in a flexible manner. For the attachment, said teeth may engage in the groove 6 of a sensor from the inside. A sensor 1 with such a membrane protection 3 according to the present invention may be readily installed into a bore 9 of a mounting part 10, if the outside radius of the membrane protection 3 does not exceed the outside radius of sensor 1.

The membrane protection 3 shown in FIG. 2 exhibits a central aperture 5, through which a medium can pass. Said medium is a carrier of the information to be measured and thus transmits physical variables such as acoustic waves, pressure, temperature and/or other variables.

Figure 3:
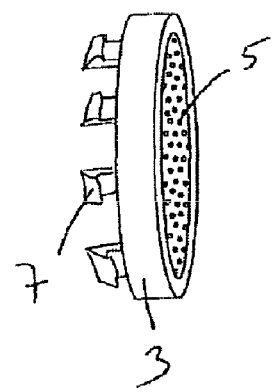
FIG. 3 is a schematic perspective view of another membrane protection according to the present invention.

In FIG. 3 a further embodiment of a membrane protection 3 according to the present invention is shown. In contrast to the first illustrated membrane protection 3 this embodiment exhibits a plurality of apertures 5, through which the medium with the information can pass. Depending on the application this embodiment offers a superior protection e.g. as flame retardant.

Advantageously, the membrane protection 3 is manufactured from a material which is refractory, so that it is suitable for the employment of the sensor 1 to be used, e.g. in a combustion chamber. A temperature resistance of up to 500° C. is advantageous. A variety of known metals or alloys meet these requirements.

A surface coating of the membrane protection 3 has the advantage that a sooting e.g. caused by an application in a combustion chamber, is greatly reduced. This applies even more, if the membrane protection 3, as shown in FIG. 3 exhibits a plurality of apertures 5.

Mounting and dismounting of the membrane protection 3 according to the present invention can be performed easily and without using a tool in the front region 8 of a sensor 1, without damaging the membrane 2. Said embodiment has an advantageous size, i.e. the diameter of the membrane protection 3 does not exceed the diameter of the front region 8 of sensor 1. Thus, a sensor 1 with such a membrane protection 3 may be inserted into an appropriate bore, wherein when removing sensor 1 the membrane protection 3 is automatically removed with sensor 1.

Preferably, the membrane protection 3 may be attached in the front region 8 of the sensor 1 in a rotary manner. Thus the load on membrane 2 is reduced during the assembly, when sensor 1 is screwed in.

Figure 4:
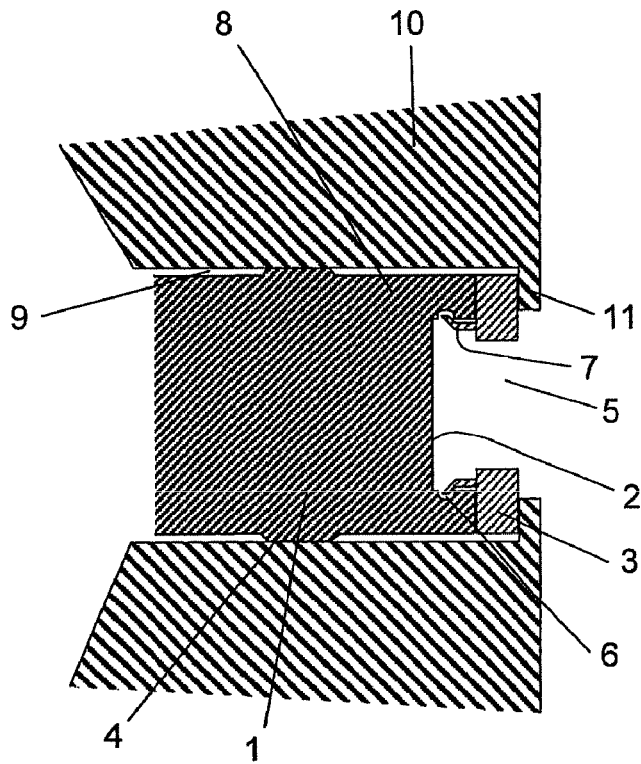
FIG. 4 is a section of a sensor according to the present invention with a membrane protection in the incorporated state.
Figure 5:
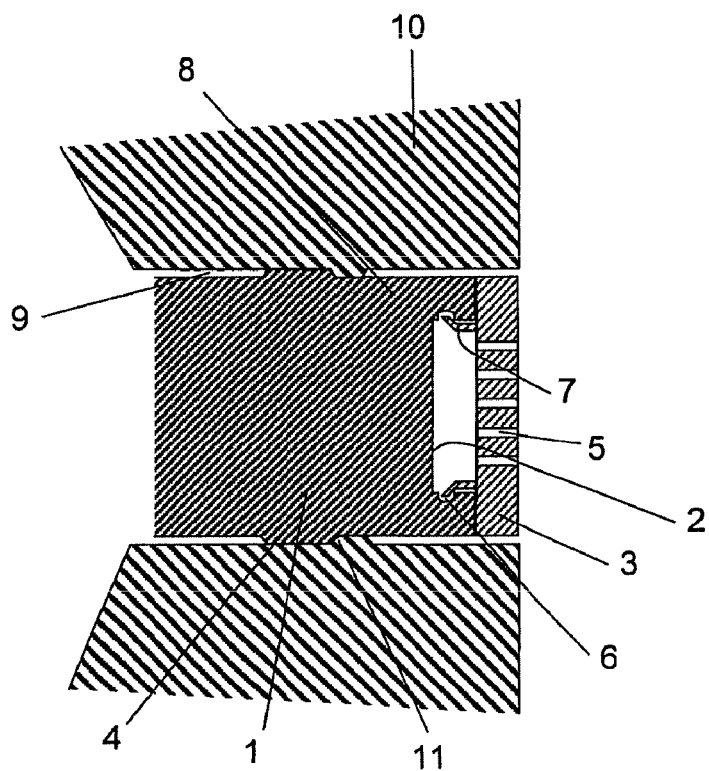
FIG. 5 is a section of an alternative sensor according to the present invention with a membrane protection in the incorporated state.

FIGS. 4 and 5 show sensors 1 according to the present invention in the incorporated state. FIG. 4 shows a front-sealing sensor 1, for example a pressure sensor. It is screwed in at a thread 4 in a bore 9 of a mounting part 10 and rests at the frontal face on an stopper 11 designed for this purpose. In order to achieve a sealing effect at this surface to stopper 11 when it is screwed in, the front face of the sensor 1 has to be very even. Since according to the present invention the membrane protection 3 is arranged between sensor 1 and stopper 11, said membrane protection 3 has to seal on both sides, i.e. to the sensor 1 and to the stopper 11. The membrane protection 3 prevents a mechanical damage of the front of the sensor if sensor 1 is repeatedly screwed in and off.

In FIG. 5 a shoulder-sealing sensor 1 according to the present invention is shown in the incorporated state. In this embodiment the stopper 11 is not attached at the front of the sensor 1 but farther behind, for example in the region of thread 4. Here, the membrane protection 3 is flush with the end of bore 9. Owing to the clip system 7 it is connected with the sensor and does not fall through the bore, as it would be the case with a non-fixed membrane protection according to the prior art. Thus, the membrane protection 3 according to the present invention is applicable more versatile.

In this example of FIG. 5 a membrane protection 3 with a plurality of apertures 5 is shown. Of course, the described embodiments according to the present invention may be arbitrarily combined and/or exchanged. Thus, a front-sealing sensor according to FIG. 4 is also suitable with a membrane protection 3 with a plurality of apertures 5 according to FIG. 3, and a shoulder-sealing sensor 1 according to FIG. 5 is also suitable with a membrane protection 3 having a central aperture 5 according to FIG. 2. Furthermore, all sensors 1 according to the present invention may be used in principle with or without membrane protection 3.

A further advantage of a surface coating of the membrane protection 3 resides in the improved sliding properties by reduced friction to the elements adjacent to the membrane protection 3, in particular to the membrane 2 and mounting part 10. This enhances the rotatability of membrane protection 3 and prevents it from being jammed when it is inserted in and removed from a mounting part 10.

REFERENCE SYMBOL LIST

1 sensor
2 membrane
3 membrane protection
4 thread
5 apertures
6 groove
7 clip system, teeth
8 front region
9 bore
10 mounting part
11 stopper (sealing)

The invention claimed is:

1. Membrane protection for a front-sealing sensor which may be screwed into a bore of a mounting part and which is provided with a membrane in a front region, the membrane protection comprising: a clip system configured for attachment in the inside of the front region of such a sensor.

2. Membrane protection according to claim 1 for a front-sealing sensor, wherein in the incorporated state, the membrane protection is clipped between the sensor and the mounting part in a sealing manner.

3. Membrane protection according to claim 1, wherein the membrane protection may be attached in the front region of the sensor in a rotary manner.

4. Membrane protection according to claim 1, wherein a large-area, central aperture is defined for the passage of the information to be measured.

5. Membrane protection according to claim 1, wherein a plurality of apertures is defined for the passage of the information to be measured.

6. Membrane protection according to claim 1, wherein the membrane protection consists of a material which tolerates temperatures of up to 500° C.

7. Membrane protection according to claim 1, wherein the membrane protection exhibits a surface coating.

8. Front-sealing sensor for screwing in into a bore of a mounting part, comprising: a membrane in a front region of the sensor and a membrane protection attached in the inside at the front region by means of a clip system.

9. Front-sealing sensor according to claim 8, further comprising a groove defined in the inside of the front region for engaging the clip system.

10. Front-sealing sensor according to claim 8, wherein the diameter of the membrane protection does not exceed the diameter of the front region of the sensor.

11. Front-sealing sensor according to claim 8, wherein in the incorporated state the membrane protection is clipped between sensor and the mounting part in a sealing manner.

12. Front-sealing sensor according to claim 8, wherein the membrane protection is attached in the front region of the sensor in a rotary manner.

13. A front-sealing sensor according to claim 8, wherein a large-area, central aperture is defined in the membrane protection for the passage of the information to be measured.

14. A front-sealing sensor according to claim 8, wherein a plurality of apertures is defined in the membrane protection for the passage of the information to be measured.

15. A front-sealing sensor according to claim 8, wherein the membrane protection consists of a material which tolerates temperatures of up to 500° C.

* * * * *